(12) United States Patent
Ambite Iglesias et al.

(10) Patent No.: US 7,510,144 B2
(45) Date of Patent: Mar. 31, 2009

(54) ELASTIC PRE-DEFORMED FAIRINGS FOR AIRCRAFTS

(75) Inventors: Juan Carlos Ambite Iglesias, Madrid (ES); Fernando Martin Prieto, Madrid (ES); Miguel Angel Calero Gallardo, Madrid (ES); Antonio Cala Romero, Seville (ES)

(73) Assignee: Eads Construcciones Aeronauticas, S.A., Madrid (ES)

( * ) Notice: Subject to any disclaimer, the term of this patent is extended or adjusted under 35 U.S.C. 154(b) by 241 days.

(21) Appl. No.: 11/435,364

(22) Filed: May 16, 2006

(65) Prior Publication Data
US 2009/0057483 A1      Mar. 5, 2009

(30) Foreign Application Priority Data
Mar. 16, 2006  (EP) .................................. 06381012

(51) Int. Cl.
*B64C 5/02*      (2006.01)
*B64C 23/00*     (2006.01)
(52) U.S. Cl. ........................................ 244/87; 244/130

(58) Field of Classification Search .................... 244/87, 244/130, 131, 132
See application file for complete search history.

(56) References Cited

U.S. PATENT DOCUMENTS

| 2,927,749 | A | * | 3/1960 | Brownell | .................. | 244/45 R |
| 3,968,946 | A | * | 7/1976 | Cole | .......................... | 244/214 |
| 5,106,037 | A | * | 4/1992 | Sherrill | ...................... | 244/132 |
| 7,216,922 | B2 | * | 5/2007 | Tuohimaa et al. | ........ | 296/180.1 |

* cited by examiner

*Primary Examiner*—Rob Swiatek
(74) *Attorney, Agent, or Firm*—Ladas & Parry LLP

(57) ABSTRACT

A fairing for streamlining the junction between the horizontal stabilizer and the fuselage or the fin of an aircraft, comprising an upper fairing shell, a lower fairing shell, a leading edge extension, and several fittings to join the upper and lower fairing shells to the horizontal stabilizer. The upper and lower fairing shells are solid laminates of composite material that are designed with a shape, composition, and thickness such that they can be elastically deformed when they are fitted to the horizontal stabilizer, providing a contact force permitting them to lay permanently in contact with the fuselage or fin. A process for manufacturing the fairing shells.

3 Claims, 11 Drawing Sheets

SECTION A-A

ELASTIC PRE-DEFORMED FAIRINGS FOR AIRCRAFTS

FIELD OF THE INVENTION

The present invention refers to fairings that streamline the junction between the horizontal stabilizer (HS) and the fuselage or the fin of an aircraft.

BACKGROUND

Typical aircraft designs incorporate fairings streamlining the junction between the horizontal stabilizer and the fuselage or the fin.

The definition of the fairings may be divided conceptually in four parts:
- two parts, called fairings shells, that smooth the intersection between the horizontal stabilizer upper and lower surfaces and the fuselage or vertical stabilizer surface.
- a third part, called leading edge extension (LEX), that smoothes the intersection between the leading edge surface of the horizontal stabilizer and the fuselage or vertical stabilizer surface.
- the fourth part is comprised by several fittings that join the fairings to the horizontal stabilizer main structure.

The preferred materials for the parts mentioned above are:
- Upper and lower fairings: composite materials (solid laminate from tape and/or fabric prepregs).
- LEX: metallic materials (formed sheet and machined aluminium alloy)
- Fairing fittings: metallic materials (machined aluminium alloy)

One of the main requirements that govern the design of these fairings is to prevent the scooping effect of the negative air pressures minimising the gap with the contact surface especially in the frontal edge to the aerodynamical stream. This scooping may cause a blow out of the fairing due to internal over pressure.

Known fairings face this issue incorporating either a guiding profile in the frontal edge or a set of complex spring-loaded mechanisms that push the fairing shells against the contact surface.

This invention is intended to provide HS to fuselage or fin new fairings with the following advantages:
- Adaptability to more complex contact surfaces (i.e. with variable curvature).
- Higher simplicity and lower cost (i.e. less number of parts).
- Easier and lower cost installation and removal.
- Improved aerodynamic smoothness.
- Weight saving.
- Easier and lower cost maintainability.

SUMMARY OF THE INVENTION

In a first aspect, the present invention provides a fairing for streamlining the junction between the horizontal stabilizer and the fuselage or the fin of an aircraft, comprising an upper fairing shell, a lower fairing shell, a leading edge extension, and several fittings to join the upper and lower fairing shells to the horizontal stabilizer in which the upper and lower fairing shells are solid laminates of composite material that are designed with a shape, compositions and thickness such that they can be elastically deformed when they are fitted to the horizontal stabilizer, providing a contact force permitting them to lay permanently in contact with the fuselage or fin.

In a second aspect, the present invention provides a process for manufacturing the above-mentioned upper and lower fairing shells that comprises the following steps:
 a) Define the shape, laminate composition and thickness of the fairing shells complying with aerosmoothness requirements according to theoretical criteria;
 b) Build a first finite element model of the fairing shells as installed in their fittings but before being deformed;
 c) Test the deformation of the fairing shell models under predetermined values of aerodynamic suction;
 d) Modify the definition of the shape, laminate composition and thickness of the fairing shell models according to the results of step c);
 e) Build a second finite element model of the fairing shells as just installed in their fittings and deformed consequently;
 f) Test the deformation of the fairing shell models and its separation from the fuselage under predetermined values of aerodynamic suction and predetermined enforced displacements of its edges;
 g) Modify the definition of the shape, laminate composition and thickness of the fairing shell models according to the results of step f);
 h) Manufacture a sample of the fairing shells using a modifiable tool able to adjust slightly its shape;
 i) Test the separation of the fairing shell samples from the fuselage under predetermined loads;
 j) Modify the definition of the shape of the fairing shell according to the results of step i).

The fairing according to this invention is designed with a deformation on assembly concept that enables the fairing to lay permanently in contact with the fuselage or fin structures without requiring any guidance in the frontal edge or other more complex mechanisms, even when subjected to the in-flight aerodynamic suction loads.

This fairing is conceived mainly to improve the design of movable fairings (i.e. those for trimable horizontal tails) but it may be applied to fixed fairings too. For movable fairings, the induced assembly load may vary along the operating range.

The design of fairings in accordance with the present invention is based on theoretical analyses supported by tests and practical developments that finally allow their manufacture and certification for commercial aircrafts.

The features, objects and advantages of the invention will become apparent by reading this description in conjunction with the accompanying drawings, in which:

BRIEF DESCRIPTION OF DRAWINGS

FIG. 1, which includes

FIG. 2, which includes

FIG. 4, which includes

DETAILED DESCRIPTION OF THE INVENTION

Figure 1A:
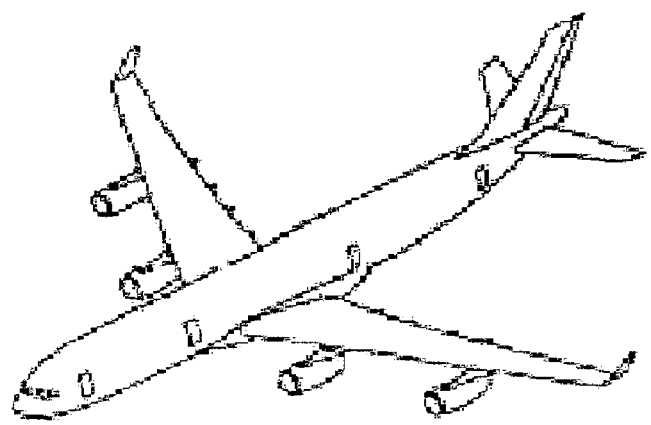
FIGS. 1a-d shows the location of a fairing in an aircraft.
Figure 1B:
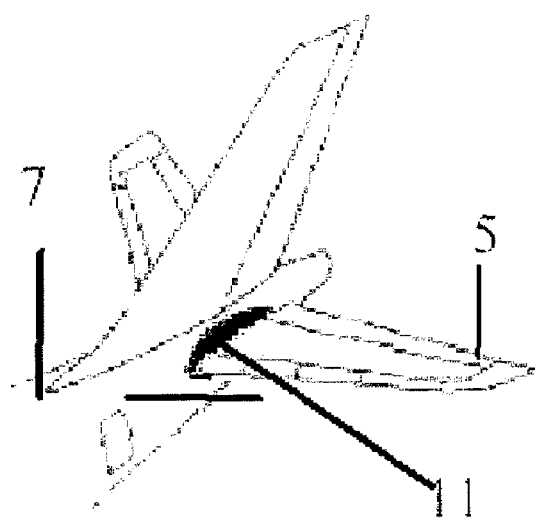
Figure 1C:
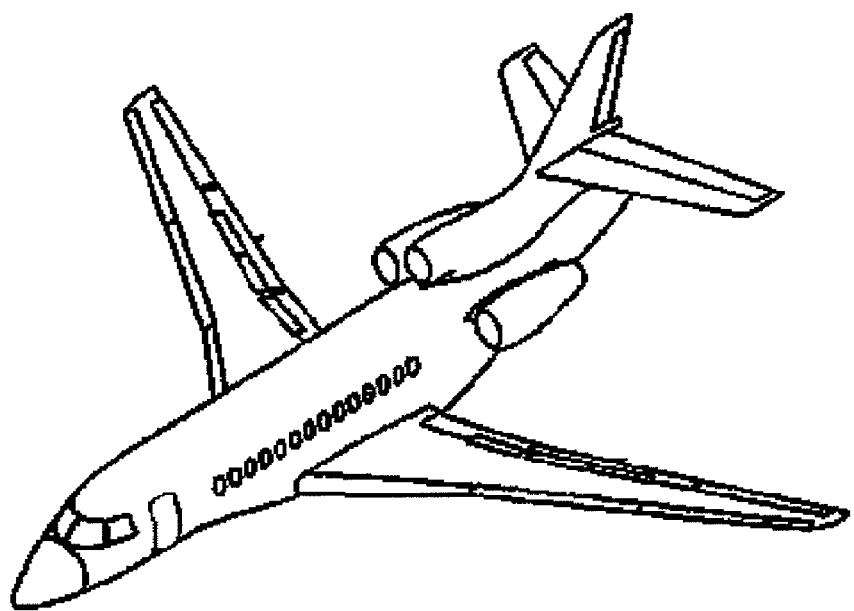
Figure 1D:
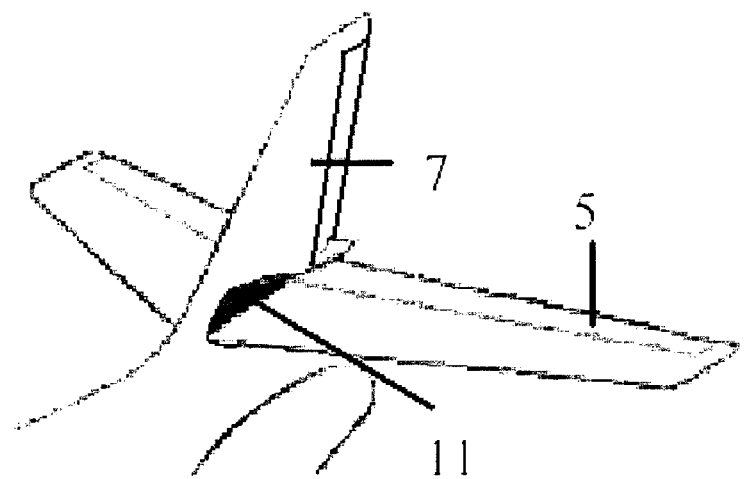
Figure 2A:
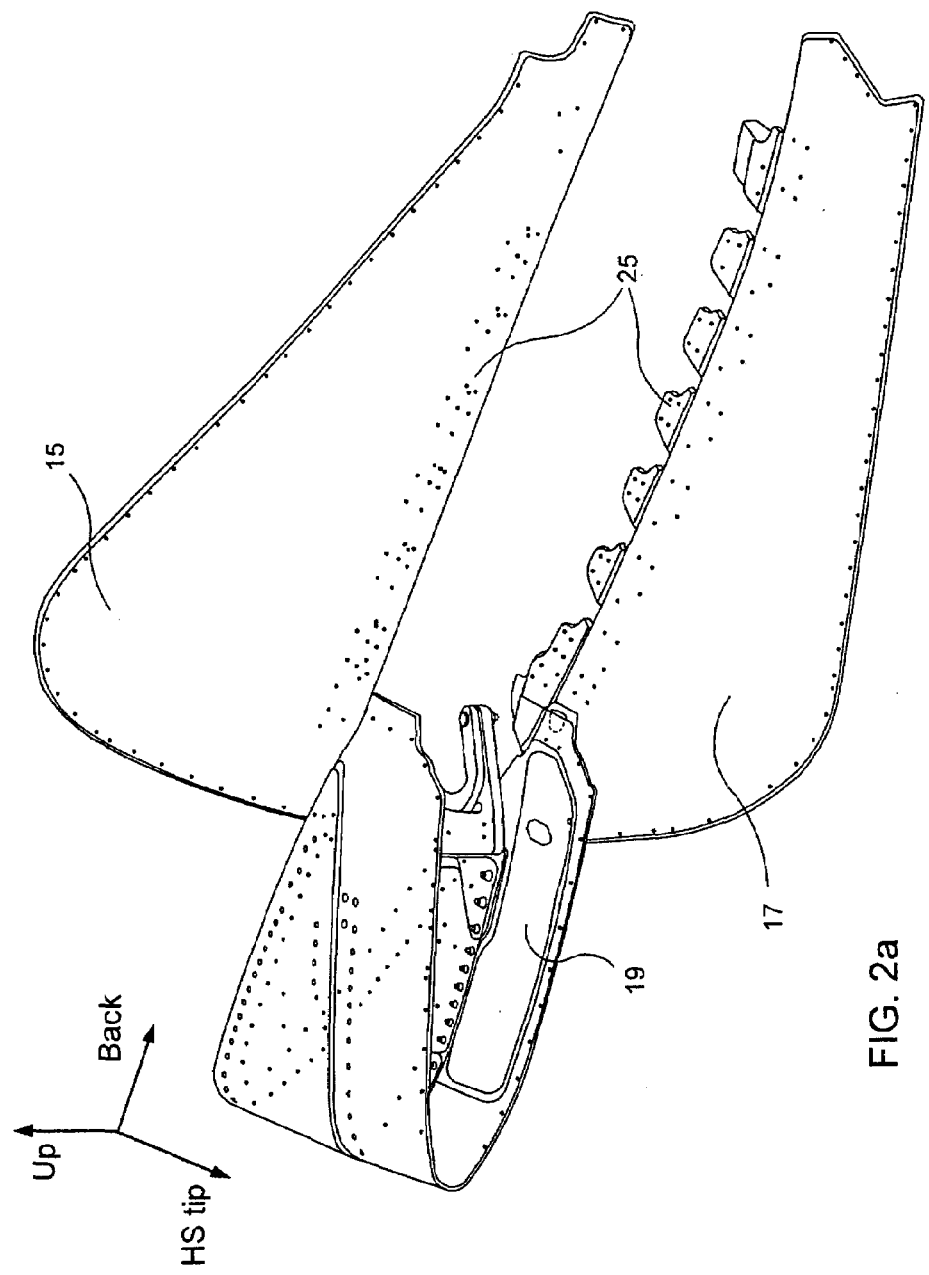
FIGS. 2a-b, shows the complete assembly of the fairing according to the present invention in external and internal views.
Figure 2B:
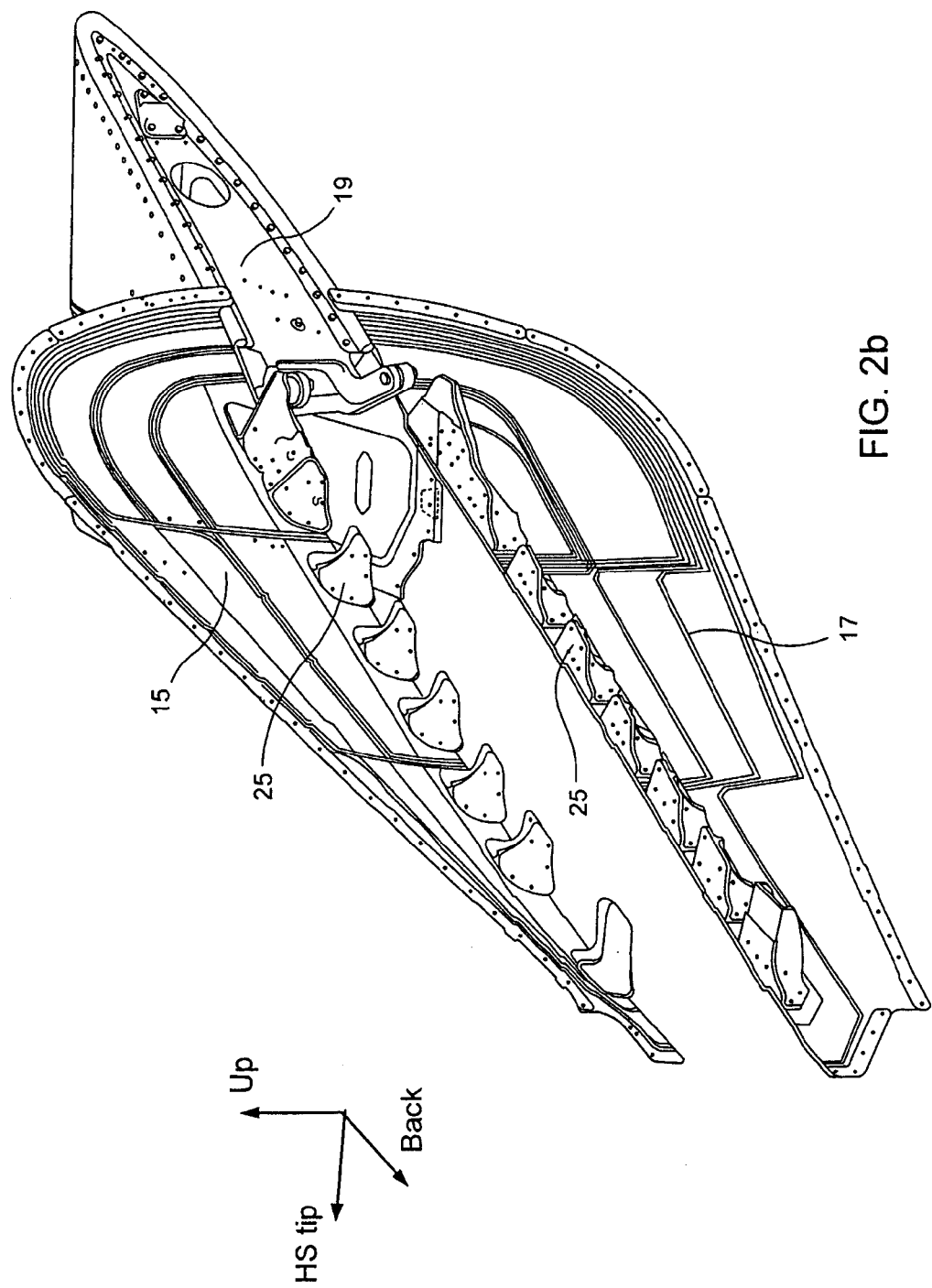
Figure 3A:
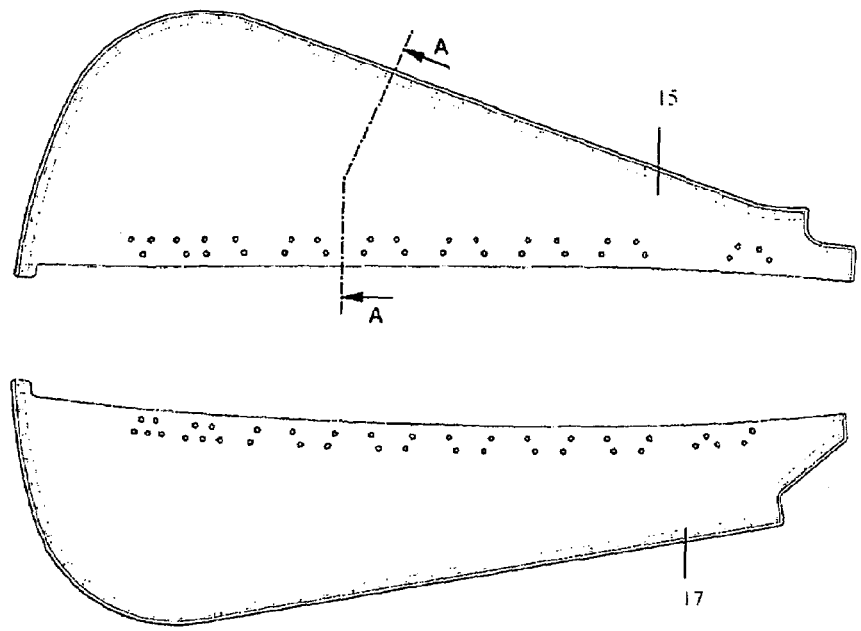
FIG. 3a shows the upper and lower fairing shells.
Figure 3B:
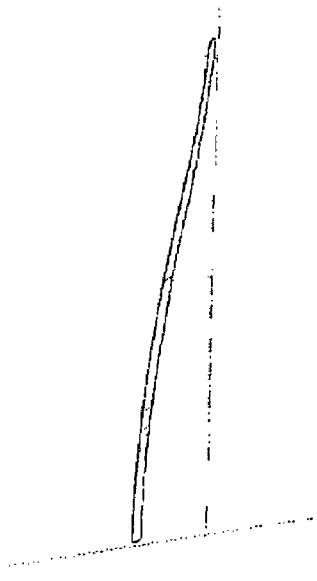
FIG. 3b shows a section A-A of the upper fairing shell.
Figure 4A:
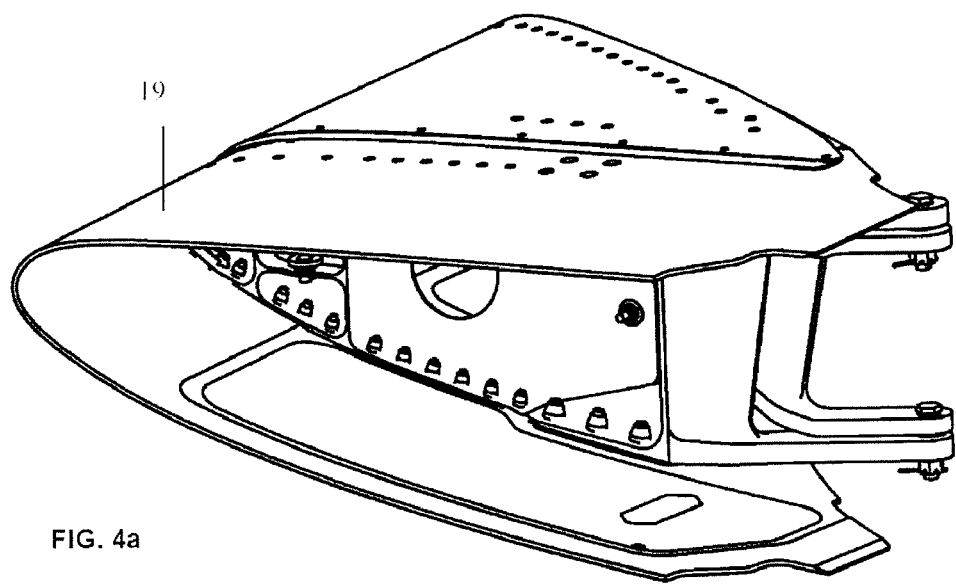
FIGS. 4a-c, shows the assembly of the leading edge extension.
Figure 4B:
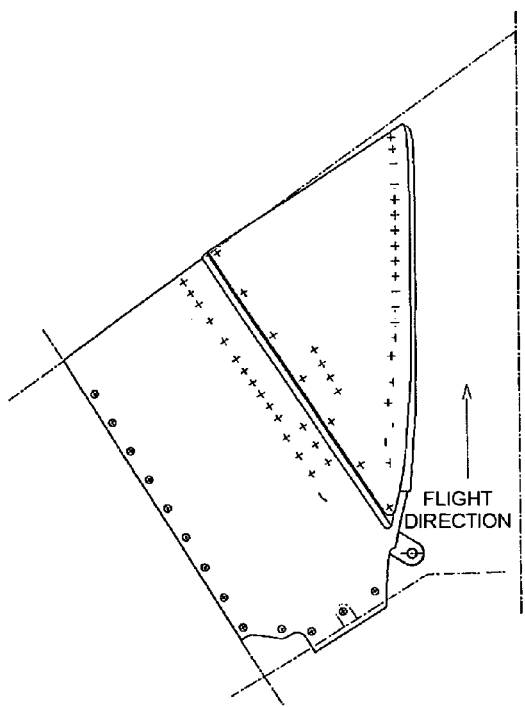
Figure 4C:
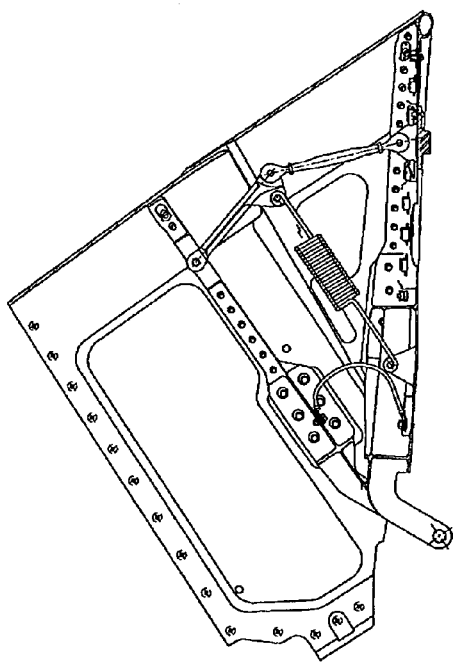

Fairings between horizontal stabilizers and fuselages or vertical stabilizers of aircrafts are mainly required to:
Streamline the connection between both structural components providing the required aerodynamic smoothness.

For trimable horizontal stabilizers, the fairing provides also aerodynamic continuity to the fuselage or fin surfaces.

Minimize the gap under load with the contact surface on the fuselage or the vertical stabilizer especially in the front edge to the aerodynamical stream.

Withstand and transfer aerodynamical loads to the main box of the horizontal stabilizer.

Be removable to gain access to the horizontal stabilizer central structure.

With reference to FIGS. 1-5, the components of the fairing 11 of this invention are detailed described below, as well as their assembly:

Upper and Lower Fairing Shells 15, 17

These consist of two CFRP (Carbon Fiber Reinforced Plastic) solid laminate shells 15, 17 are screwed to dedicated fittings 25 attached to the horizontal stabilizer 5 main structure. Both fairing shells 15, 17 are then removable to allow access to the horizontal stabilizer (HS) 5 central structure.

The manufactured shape of these shells 15, 17 differs from the shape once installed on the aircraft so that the induced elastic deformation provides a permanent contact force (on this way the fairing acts as a spring) and so prevent the separation from the contact surface 7 even when loaded by the aerodynamic pressures in flight. The development process of these parts may be arduous and constitutes an important challenge of the present invention.

For designs of fairing shells with moderate curvature even in two directions, an optimised mixture of unidirectional tape and plain fabric prepregs should be enough to meet both strength and stiffness requirements. Fairing shells with high curvature may require some slots, carefully defined, to permit functional and/or structural deformation compatible with the required strength and stiffness.

For movable fairings, materials at the contact edge are to be chosen to ensure good sliding, wearing and sealing behaviour in combination with the fuselage or fin skin materials. Teflon materials are a good choice for this application.

Leading Edge Extension (LEX) 19

This consists of a metallic assembly comprising a fixed plus a movable part. The latter is hinged on the former and pushed on to the fuselage or fin 7 by a spring mechanism. This mechanism ensures the permanent contact with the fuselage or fin surfaces 7 when aerodynamic suction is applied.

Both the fixed and the movable parts are basically composed of:

An external skin made of aluminium alloy formed sheet, chemically milled if required.

An aluminium alloy machined rib. Ribs in both parts are hinged one to each other in a scissors type assembly.

A mechanism composed of two links plus a spring ensures the permanent contact between the LEX and the fuselage or the fin surface 7 even when loaded.

The complete LEX assembly is removable from the HS 5 box since is screwed to the skins and inboard fixed leading edge rib.

Materials at the contact surfaces are again chosen to ensure a good sliding, wearing and sealing behaviour.

For fixed fairings, a conventional simple Leading edge extension is applicable.

The design of the LEX may have to comply with the applicable airworthiness requirements regarding bird strike resistance.

Fairing Fittings

The upper and lower CFRP fairings shells 15, 17 are bolted to a series of aluminium alloy machined fittings 25 (channel type) fastened to the HS 5 main structure. Floating anchor nuts are provided to allow the fairings installation.

These fittings 25 are required to maintain the fairing shells 15, 17 on the installed position transferring both assembly and aerodynamical loads to the main structure of the horizontal stabilizer 5.

Complete Fairing Assembly

The final assembly of the fairing is accomplished by joining afore mentioned parts.

Fairing fittings 25 are attached thru fasteners (either fixed or removable) to the upper and lower HS 5 main box skin covers. A precision tooling will be required to locate these fittings 25 if fairings are to be interchangeable. Some designs permit the adjustment on assembly of these fittings.

Figure 5:
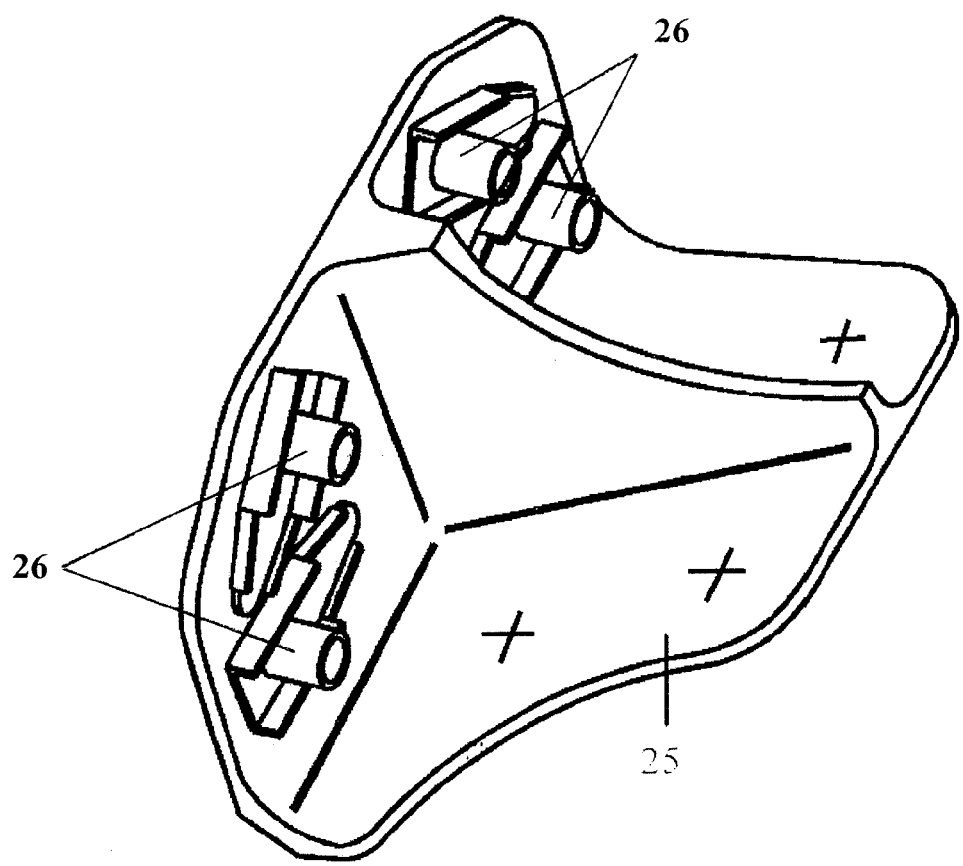
FIG. 5 shows a typical fairing fitting.

Upper and lower fairing shells 15, 17 are then bolted to the fixed fittings 25 using, for example, bolts 26 shown in FIG. 5. Hole sizes and fits at these joints should be carefully defined to reduce manufacturing costs and ease assembly process. If fairings are to be interchangeable, a precision tool is required to drill holes in both fairing shells 15, 17 and fittings.

Another special tool may be required to install the fairing shells 15, 17 on the fittings 25 as both will certainly not match and some amount of force on assembly will be required. Special care will be put in defining the tightening torque of the bolts as tests have revealed a major influence on the fairing behaviour.

Finally, the leading edge extension 19 is screwed to the horizontal stabilizer 5 main structure. A special tool is required to limit the aperture of the movable part while assembling.

Development Process of Upper and Lower Fairing Shells

Figure 6:
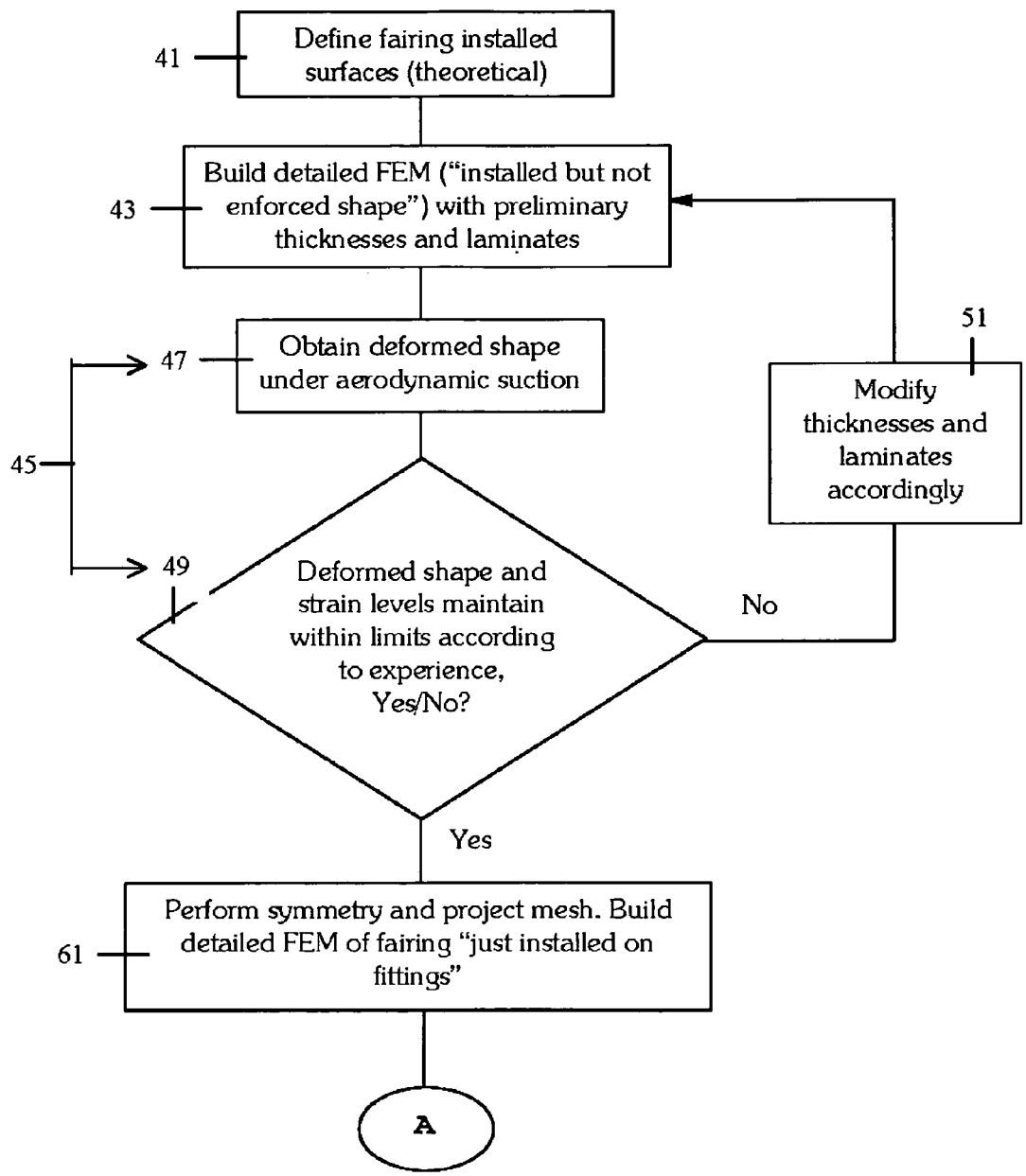
FIGS. 6, 7 and 8 shows a flowchart of the manufacturing process of a fairing according to the present invention.
Figure 7:
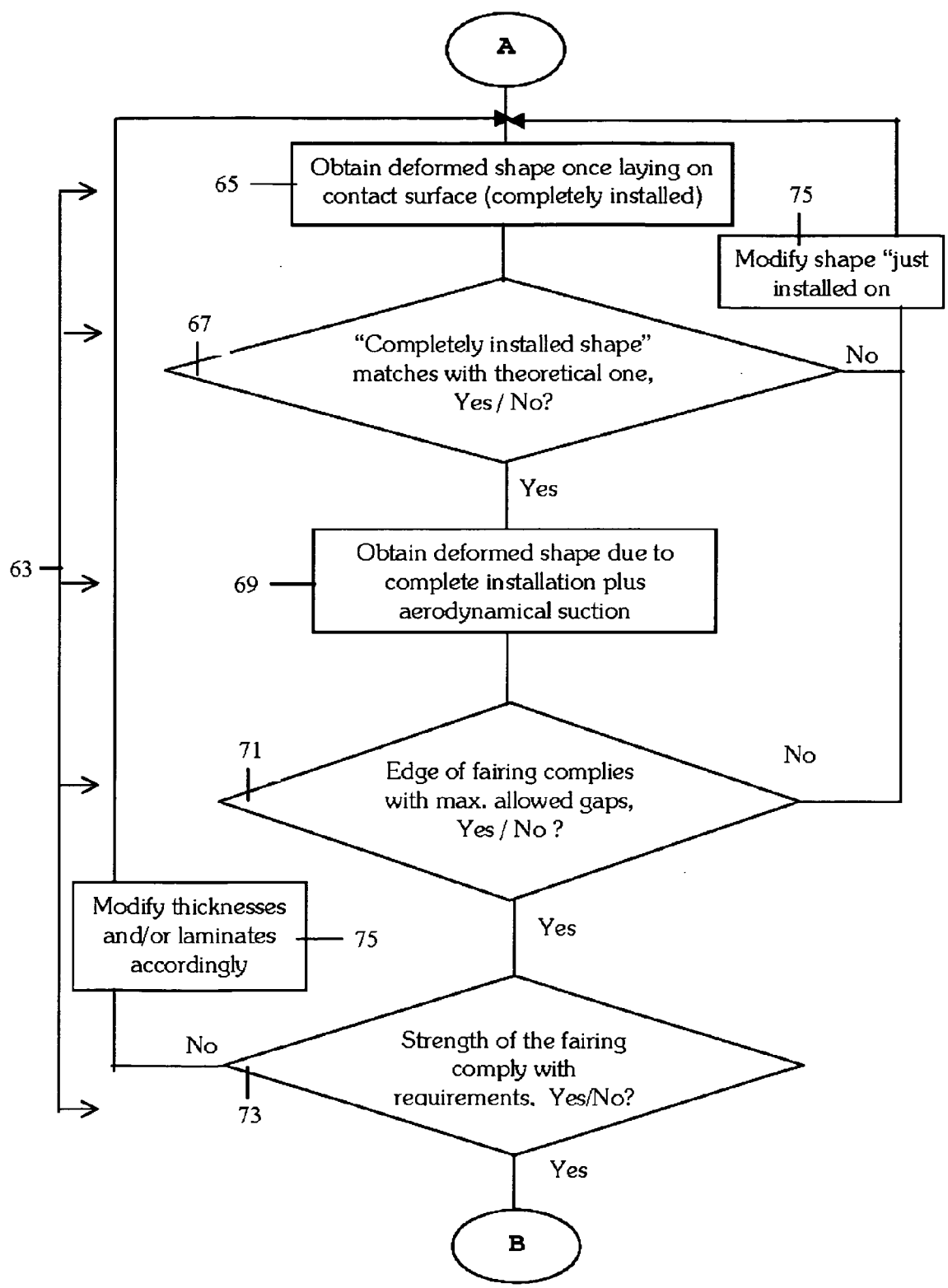
Figure 8:
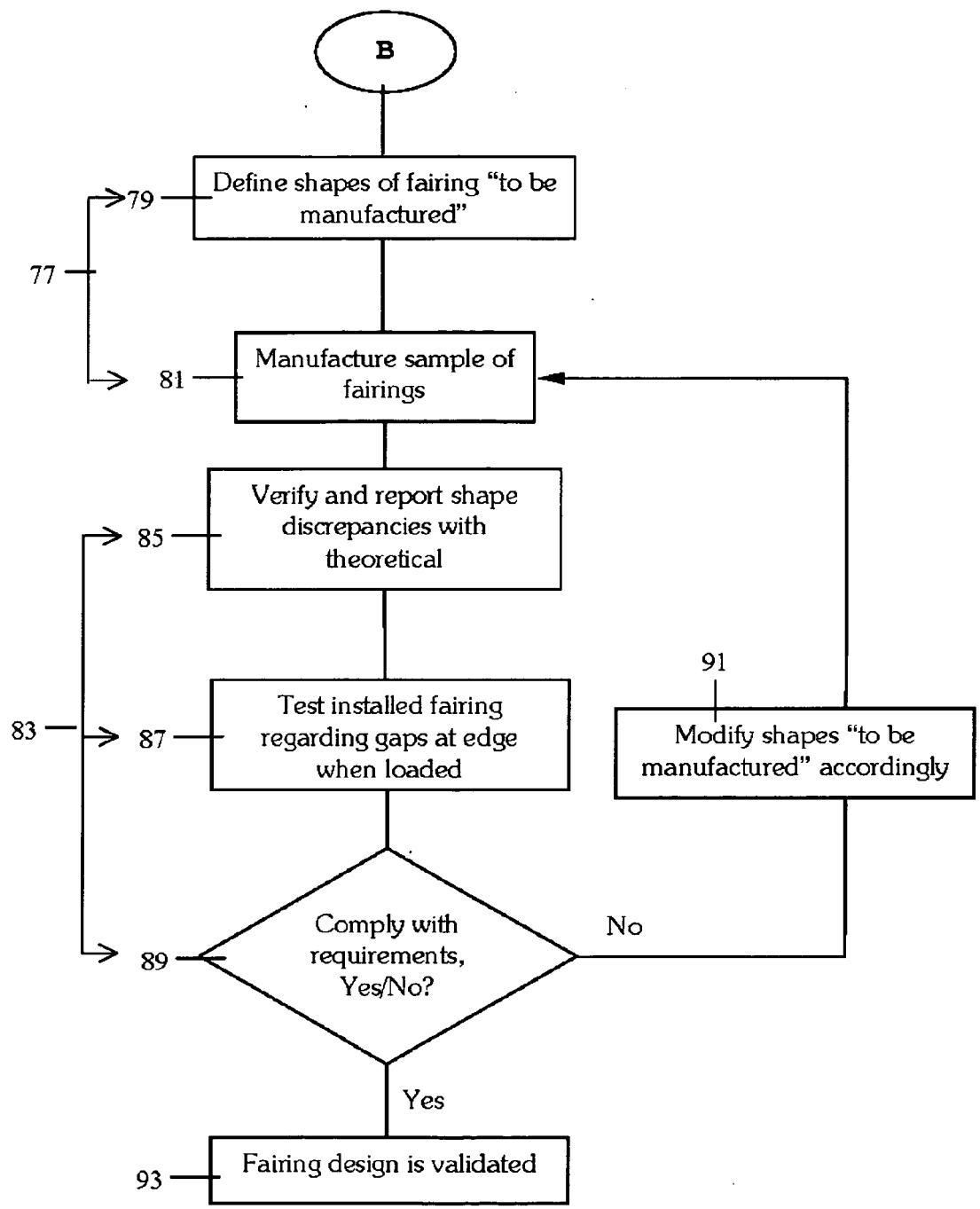

The complete design and engineering process of the upper and lower fairing shells shown in FIGS. 6-8 comprises the following steps Step 41: Define the shape, laminate composition and thickness of the fairing shells complying with aerosmoothness requirements according to theoretical criteria.

Step 43: Build a detailed finite element model of the fairing ("installed but not enforced shape") and attachment fittings. Use non-linear (large displacements) elements and locate contact simulation elements between fairing and fittings.

Step 45: Test the deformation of the fairing shell models under predetermined values of aerodynamic suction.

Sub-step 47: Obtain the deformed shape of the fairing once loaded with the applicable negative (suction) aerodynamic pressure distribution. Apply a factor on the load according to experience to be on the conservative side.

Sub-step 49: Fix the fairing and fitting thicknesses so that deformation and stress levels maintain within reasonable values according to experience.

Step 51: Modify the definition of the shape, laminate composition and thickness of the fairing shell models according to the results of step 45. The laminates are designed to minimize the spring-back of the manufactured fairings (expected spring-back may be analysed by using the above mentioned detailed F.E. model).

Step 61: Build a second finite element model of the fairing shells as just installed in their fittings and deformed consequently.

A symmetry of the deformed shape resulting from sub-step 49 is performed.

A finite element mesh is projected into this symmetrical shape and a second detailed finite element model representing the fairing "installed just on fittings" and without any other deformation on assembly is built. Contact elements at the free edge of the fairing to be able to control the eventual separation from the contact surface when loaded are provided.

Step 63: Test the deformation of the fairing shell models and its separation from the fuselage under predetermined values of aerodynamic suction and predetermined enforced displacements of its edges.

Sub-step 65: Apply enforced displacements at the edge of the fairing (so that the fairing is forced to lay on the installed position).

Sub-step 67: Control if deformed shape matches, within tolerances, with theoretical shape.

Sub-step 69: Apply both aerodynamical acting suction plus enforced displacements at the edge representing the "completely installed" position.

Sub-step 71: Control the eventual separation from the contact surface.

Sub-step 73: Check the strength of the fairing.

Step 75: Modify the definition of the shape, laminate composition and thickness of the fairing shell models according to the results of sub-steps 67, 71 and 73.

Step 77: Manufacture a sample of the fairing shells using a modifiable tool able to adjust slightly its shape.

Sub-step 79. Define the shape of the fairing shells to be manufactured taking advantage of the automatic transfer capability of surfaces from CAE to CAD tools.

Sub-step 81: Manufacture a sample of fairing shells. Use a modifiable tool to be able to adjust slightly the shape if required during the development process.

Step 83: Test the separation of the fairing shell samples from the fuselage under predetermined loads.

Sub-step 85: Verify the actual shape of the manufactured fairings and report deviations with respect to the theoretical.

Sub-step 87: Test if the manufactured fairings comply with the maximum allowed gaps at the contact edge when installed and under prescribed loads. Use a test rig representative of the joint of the fairings to the horizontal stabilizer and the contact surface of either the fuselage or the fin. Account for adverse tolerance stack up.

Sub-step 89: Control requirements.

Step 91: Modify the definition of the shape of the fairing shell according to the results of sub-step 89 until obtaining positive test results 93.

Although the present invention has been fully described in connection with preferred embodiments, it is evident that modifications may be introduced within the scope thereof, not considering this as limited by these embodiments, but by the contents of the following claims.

The invention claimed is:

1. A fairing (11) for streamlining the junction between the horizontal stabilizer (5) and the fuselage or the fin (7) of an aircraft comprising an upper fairing shell (15), a lower fairing shell (17), a leading edge extension, (19) and a plurality of fittings (25) to join the upper and lower fairing shells (15, 17) to the horizontal stabilizer (5), characterized in that the upper and lower fairing shells (15, 17) are solid laminates of composite material that are designed with a shape, composition, and thickness such that they can be elastically deformed when they are fitted to the horizontal stabilizer (5), providing a contact force permitting them to lay permanently in contact with the fuselage or fin (7).

2. A process for manufacturing the upper and lower fairing shells (15, 17) of a fairing (11) according to claim 1, comprising the following steps:
a) defining the shape, laminate compositions and thickness of the fairing shells (15, 17) complying with aerosmoothness requirements according to theoretical criteria;
b) building first finite element models of the fairing shells (15, 17) as installed in their fittings but before being deformed;
c) testing the deformation of the fairing shell (15, 17) models under predetermined values of aerodynamic suction;
d) modifying the defined shape, laminate composition, and thickness of the fairing shell (15, 17) models according to the results of step c) until obtaining positive test results;
e) building second finite element models of the fairing shells (15, 17) as installed in their fittings and deformed consequently;
f) testing the deformation of the fairing shell (15, 17) models and their separation from the fuselage under predetermined values of aerodynamic suction and predetermined enforced displacements of their edges;
g) modifying the defined shape, laminate composition, and thickness of the fairing shell (15, 17) models according to the results of step f) until obtaining positive test results;
h) manufacturing a sample of the fairing shells (15, 17) using a modifiable tool able to adjust slightly its shape;
i) testing the separation of the fairing shell (15, 17) samples from the fuselage under predetermined loads; and
j) modifying the defined shape of the fairing shells (15, 17) according to the results of step i) until obtaining positive test results.

3. An aircraft having a fairing (11) streamlining the junction between the horizontal stabilizer (5) and the fuselage or the fin (7), said fairing comprising an upper fairing shell (15), a lower fairing shell (17), a leading edge extension, (19) and a plurality of fittings (25) to join the upper and lower fairing shells (15, 17) to the horizontal stabilizer (5), characterized in that the upper and lower fairing shells (15, 17) are solid laminates of composite material that are designed with a shape, composition, and thickness such that they can be elastically deformed when they are fitted to the horizontal stabilizer (5), providing a contact force permitting them to lay permanently in contact with the fuselage or fin (7).

* * * * *